US012140724B2

United States Patent
Wu et al.

(10) Patent No.: US 12,140,724 B2
(45) Date of Patent: Nov. 12, 2024

(54) VELOCITY CORRECTION WITH JOINT INVERSION

(71) Applicant: Halliburton Energy Services, Inc., Houston, TX (US)

(72) Inventors: Xiang Wu, Singapore (SG); Yadong Wang, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/484,397

(22) Filed: Sep. 24, 2021

(65) Prior Publication Data

US 2023/0098032 A1 Mar. 30, 2023

(51) Int. Cl.
*G01V 3/20* (2006.01)
*G01V 3/36* (2006.01)
*G01V 3/38* (2006.01)

(52) U.S. Cl.
CPC .................. *G01V 3/20* (2013.01); *G01V 3/38* (2013.01); *G01V 3/36* (2013.01)

(58) Field of Classification Search
CPC ... G01V 3/20; G01V 3/18; G01V 3/38; G01V 3/36; G01V 3/02; G01V 3/04; G01V 3/06; G01V 3/22; G01V 3/24; G01V 3/34; G01V 1/28; G01V 1/303; G01V 1/306; G01V 1/32; G06V 30/192; G06V 30/19; G06V 30/196; G06V 40/167; G01N 2223/426;
(Continued)

(56) References Cited

U.S. PATENT DOCUMENTS

| 2007/0029083 A1* | 2/2007 | Folberth | G01V 3/24 166/254.2 |
| 2012/0133367 A1* | 5/2012 | Bittar | E21B 43/26 324/346 |

(Continued)

FOREIGN PATENT DOCUMENTS

| EP | 2867463 | 1/2019 |
| WO | 00-30013 | 5/2000 |

(Continued)

OTHER PUBLICATIONS

Libretexts. (Mar. 24, 2021). 3.5: Motion with constant acceleration (part 1). Physics LibreTexts. https://web.archive.org/web/20210324074528/https://phys.libretexts.org/Bookshelves/University_Physics/Book%3A_University_Physics_(OpenStax)/Book%3A_University_Physics_I_-_Mechanics_Sound_Oscillations_and (Year: 2021).*

(Continued)

*Primary Examiner* — Lisa M Caputo
*Assistant Examiner* — Eric Sebastian Von Wald
(74) *Attorney, Agent, or Firm* — John Wustenberg; C. Tumey Law Group PLLC

(57) ABSTRACT

A method and system for performing a velocity correction downhole. A method may include disposing a downhole tool into a borehole, taking one or more measurements of the borehole with one or more pads disposed on the downhole tool, creating one or more images from the one or more measurements to form an image log at a depth within the borehole, identifying a mismatch distance between the one or more images in the image log, and correcting the one or more images at the depth within the borehole based at least in part on the mismatch distance.

20 Claims, 8 Drawing Sheets

(58) Field of Classification Search
CPC ............ G01N 2223/40; G01N 27/002; G05B 2219/36414; H04L 7/0029; H04L 7/002
See application file for complete search history.

(56) References Cited

U.S. PATENT DOCUMENTS

| | | | |
|---|---|---|---|
| 2013/0341091 A1* | 12/2013 | Sugiura | E21B 45/00 175/24 |
| 2014/0191762 A1* | 7/2014 | Chen | G01V 3/24 324/355 |
| 2015/0008927 A1* | 1/2015 | Cheung | G01V 3/26 324/339 |
| 2015/0260874 A1* | 9/2015 | Chen | G01V 3/24 324/338 |
| 2016/0363686 A1* | 12/2016 | Kouchmeshky | H01Q 7/00 |
| 2017/0337675 A1* | 11/2017 | Gelman | G06T 7/0004 |
| 2018/0334901 A1* | 11/2018 | Hou | E21B 47/002 |
| 2018/0342073 A1* | 11/2018 | Matsumura | G01V 8/02 |
| 2019/0094405 A1* | 3/2019 | Itskovich | G01V 3/28 |
| 2019/0113650 A1* | 4/2019 | Guner | G01V 3/38 |
| 2019/0345816 A1* | 11/2019 | Auchere | E21B 44/02 |
| 2020/0011158 A1* | 1/2020 | Xu | E21B 44/005 |
| 2020/0116883 A1 | 4/2020 | Padhi et al. | |
| 2020/0116884 A1 | 4/2020 | Weng et al. | |
| 2020/0191985 A1* | 6/2020 | Kristiansen | G01V 1/303 |
| 2021/0011189 A1 | 1/2021 | Ewe et al. | |
| 2021/0110280 A1* | 4/2021 | Akkurt | G06N 5/04 |
| 2021/0183009 A1 | 6/2021 | Hayashi | |
| 2021/0199829 A1 | 7/2021 | Wu et al. | |
| 2021/0327077 A1* | 10/2021 | Combs | E21B 44/00 |

FOREIGN PATENT DOCUMENTS

| | | | | |
|---|---|---|---|---|
| WO | 2018-063543 | | 4/2018 | |
| WO | WO-2020047085 A1 | * | 3/2020 | ............ E21B 49/00 |

OTHER PUBLICATIONS

International Search Report and Written Opinion for Application No. PCT/US2021/054426, dated Jun. 17, 2022.

* cited by examiner

VELOCITY CORRECTION WITH JOINT INVERSION

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. To detect thin beds, fracture locations, and low resistivity formations borehole imager may transmit a current through an injector electrode into the formation. A return electrode may record the current after the current has passed through the formation. Measuring this current may allow an operator to determine characteristic and properties of thin beds, fracture locations, and low resistivity formations at a specified depth in a borehole.

Traditionally, the depths of a logging tool are calculated from the double integral of accelerations recorded by an accelerometer. The double integral process accumulates errors with time. Therefore, the errors may become significantly large even if the acceleration measurement errors are small. This may lead to images which do not properly align with each other in a three-hundred-and-sixty-degree view, which may alter the readings of a formation at any given depth in a borehole.

BRIEF DESCRIPTION OF THE DRAWINGS

For a detailed description of the examples of the disclosure, reference will now be made to the accompanying drawings in which.

DETAILED DESCRIPTION

The present disclosure discloses a system and method for correcting one or more images at any specific depth within a borehole. For example, the estimated depths of a downhole tool, such as a logging tool, may be significantly biased when calculated from the double integral of acceleration measurements. To address this issue, an independent measurement, referred to as the "mismatch distance" between the two sensors, may be utilized as an external reference. This may allow for velocities of downhole tool to be estimated by joint inverting the accelerometer readings and the mismatch distances. The inverted velocities may then be used to calculate depths. Mismatch distances may provide a better estimate of the velocities and avoid error accumulation due to double integral.

Figure 1:
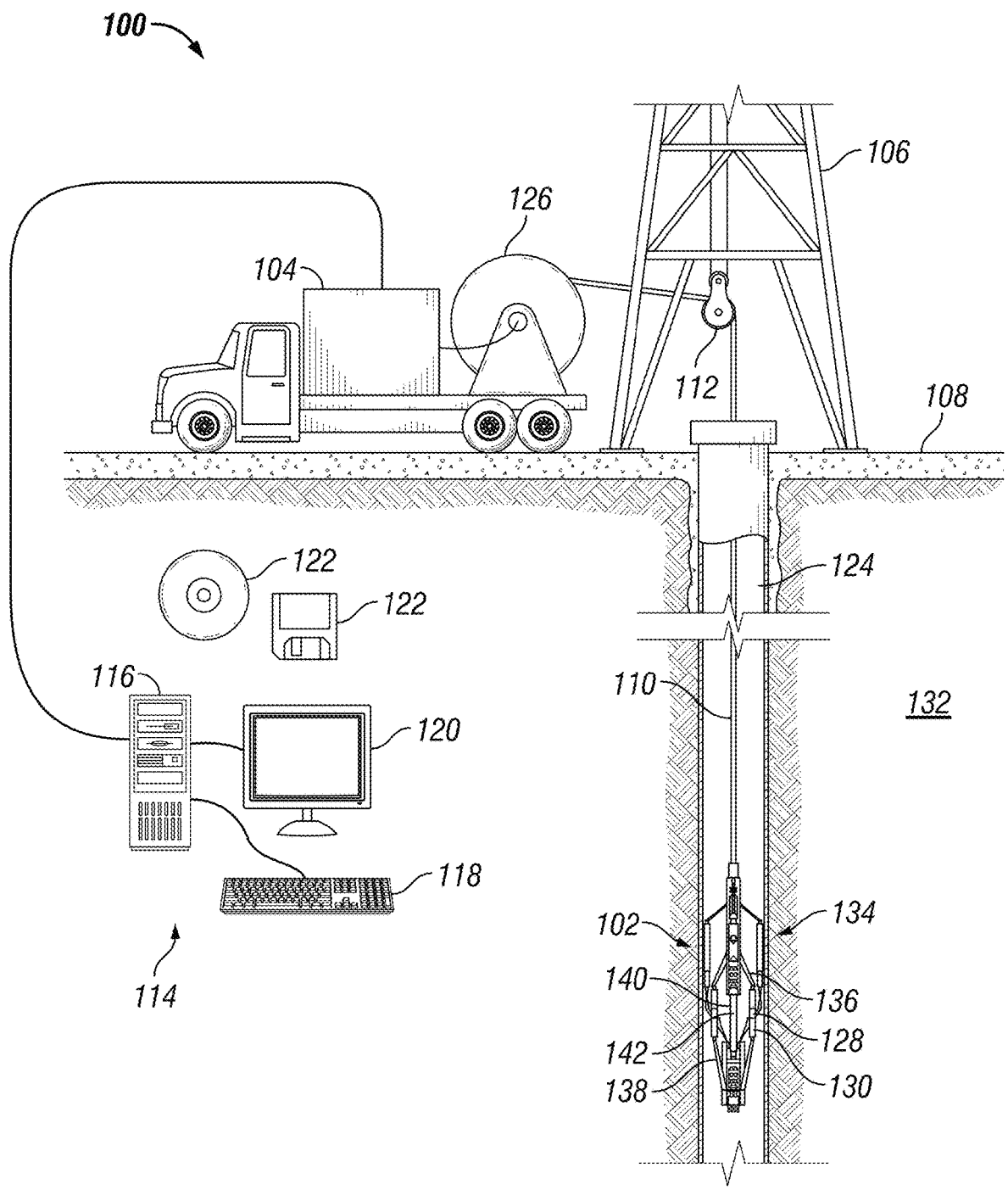
FIG. 1 illustrate an example of a well measurement system.

FIG. 1 illustrates a cross-sectional view of an example of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102.

The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode of button array 128 and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be emitted from at least one electrode from button array 128 and return to return electrode 130. In examples, current may be emitted from any transmission type electrode along downhole tool 102. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
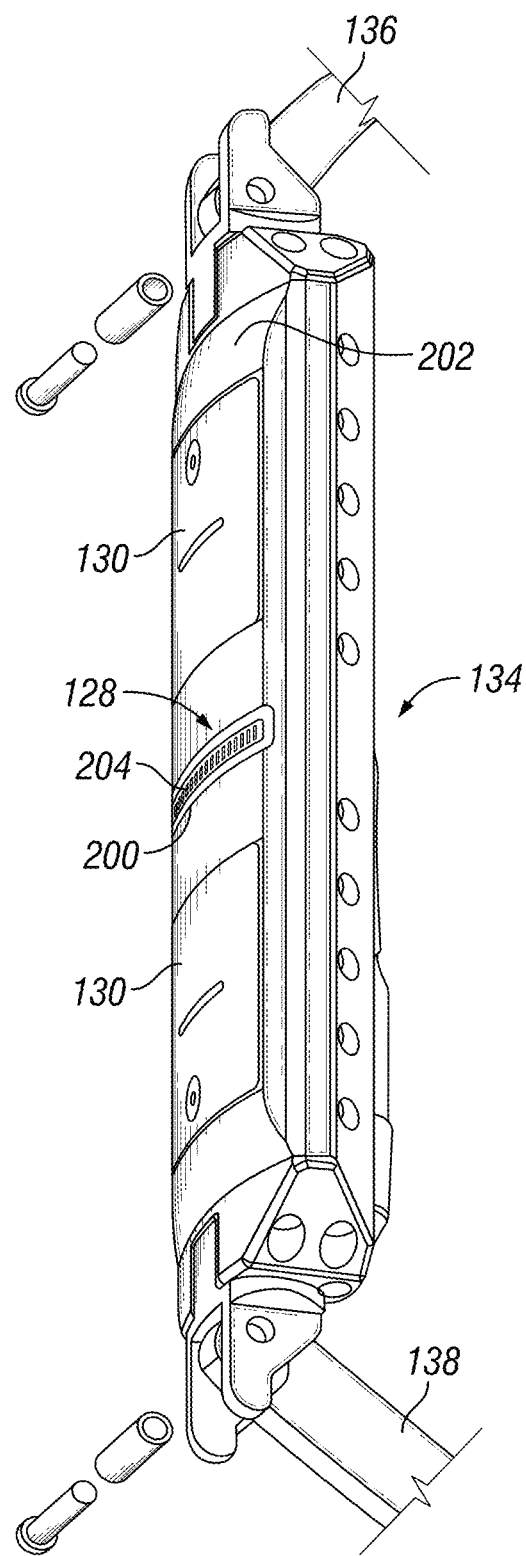
FIG. 2 illustrates an example of a pad.

FIG. 2 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. In examples, return electrode 130 and button array 128 may be disposed directly on downhole tool 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drops across button array 128 may be measured and used to estimate the impedance of formation 132. In these alternative implementations, electrodes of button array 128 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality. In examples, generally water based mud imagers do not require capacitive contact with formation 132 (e.g., referring to FIG. 1) because the resistivity of water based muds is lower than oil based muds. This allows water based mud imager tools to operate at lower frequencies the oil based mud imager tools. Likewise, interpretation of images obtained with a water based mud imager is simpler as mud properties and formation permittivity have negligible effect on measurements, in which case the disclosed processing methods may not be needed. However, there may be applications where the disclosed techniques may be applied to the water based mud imager tools; for example, to further increase the accuracy of the image or in a case where an imager tool designed for oil based muds is operated in a water based mud. Thus, although the disclosed techniques are contemplated to be primarily applicable to oil based mud imager tools, the scope of the disclosure is not limited to just oil based muds.

Returning back to FIG. 2, guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to downhole tool 102 (e.g., referring to FIG.

1). An insulating material may be used to fill the remaining portions of pad 134. In examples, ceramics may be used as the insulating material to fill the remaining portions of pad 134.

During measurement operations, measurements taken by each pad 134 may be offset from one another in both a vertical and azimuthal direction. During post processing operations, an image is formed from the measurements of each pad 134. All images formed at one or more multiple depths from one or more multiple pads 134 may be used to create an image log. However, each image is offset from one another as each pad is vertically and azimuthally offset from one another. Currently, a depth of measurement in borehole 124 is added to each image formed from each pad 134. Depths for each image are aligned to try and form a picture of borehole 124 from each pad 134, which may form a three-hundred-and-sixty-degree picture. Traditionally, the depths of downhole tool 102 within borehole 124 may be calculated from the double integral of accelerations recorded by an accelerometer 142. Utilizing information handling system 114, a double integral process is performed with accelerometer data to determine a depth, which is then associated with downhole tool 102 and each pad 134. However, the double integral process accumulates errors with time. Therefore, errors may become significantly large even if the acceleration errors are small. To avoid the error accumulation and better estimate depth, an external reference, identified as a mismatch distance, is utilized to perform a joint inversion with acceleration measurements.

Figure 3B:
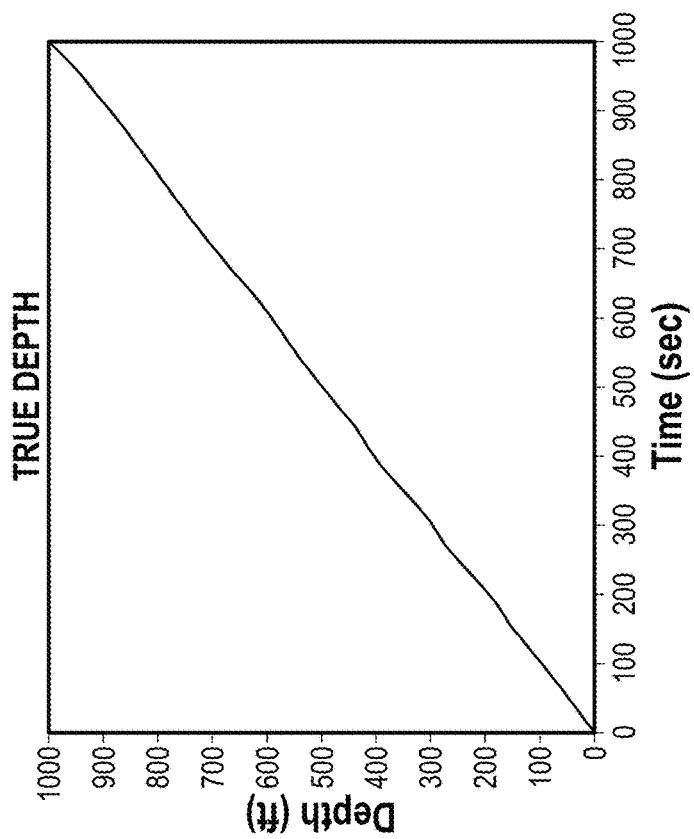
FIG. 3B illustrates a graph of a true depth of the downhole tool.
Figure 3A:
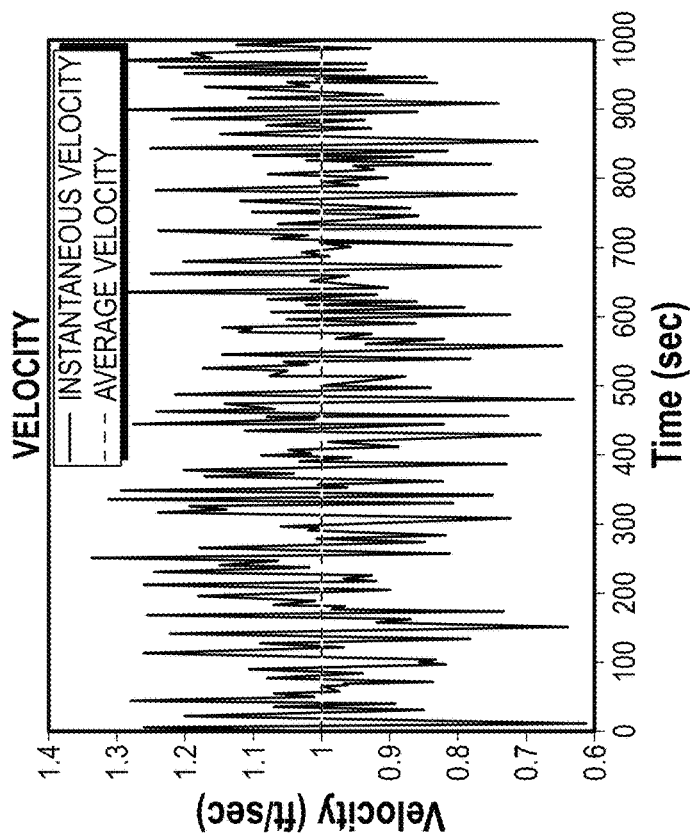
FIG. 3A illustrates a graph of an instantaneous velocity of a downhole tool.

Referring back to FIG. 1, to obtain the mismatch distance, downhole tool 102 may include at least one return electrode 130 dispose on each pad 134. Each pad 134 has a known fixed distance in a vertical and an azimuthal distance to every other pad 134 disposed on every other pad 134. In examples, the mismatch distance may be measured by comparing the images from each pad 134. In examples, it is not required for pads 134 to have the same azimuth coverage. During logging operations, which are described above, a conveyance moves downhole tool 102 in borehole 124. The average reeling velocity of the conveyance may be known, but the instantaneous velocity of downhole tool 102 within borehole 124 may vary from the average velocity, which is illustrated in the graph of FIG. 3A. FIG. 3A is populated with synthetic data. For the methods and systems described below, the average velocity may be assumed to be 1 foot per second (0.3 meters per second) and logging time intervals are 1 second. FIG. 3B, which is populated with synthetic data, illustrates a graph showing the true depth of downhole tool 102. As seen in the graph of FIG. 3B, the line measuring the true depth of downhole tool 102 is not a straight line because of the variation of the instantaneous velocity.

Figure 4A:
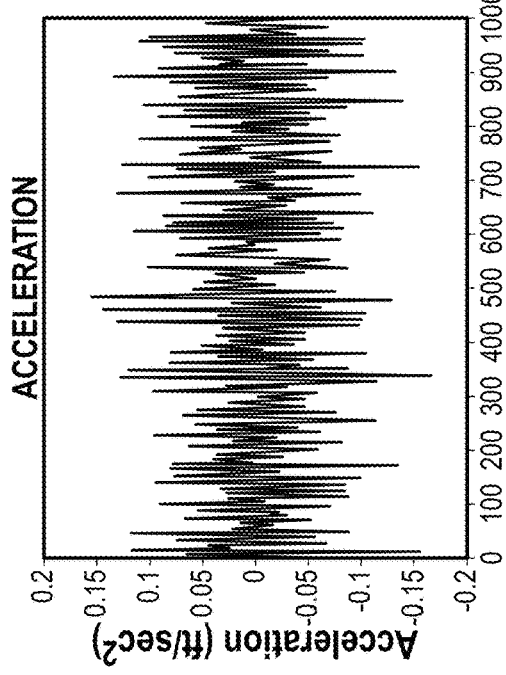
FIG. 4A illustrates a graph of a true acceleration of the downhole tool.
Figure 4B:
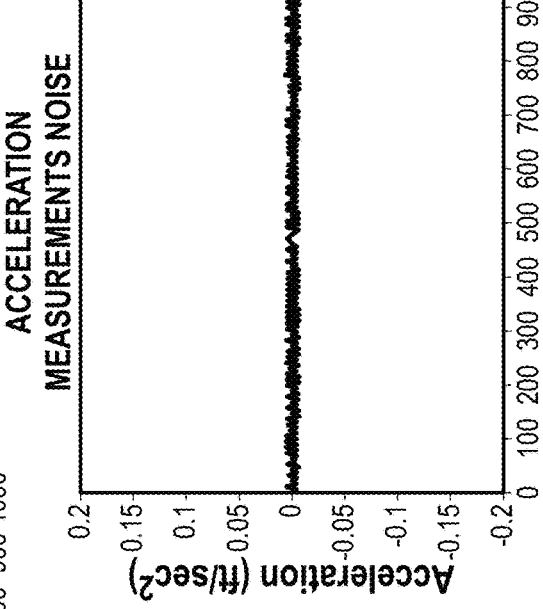
FIG. 4B illustrates a graph of noise measured during acceleration.
Figure 4C:
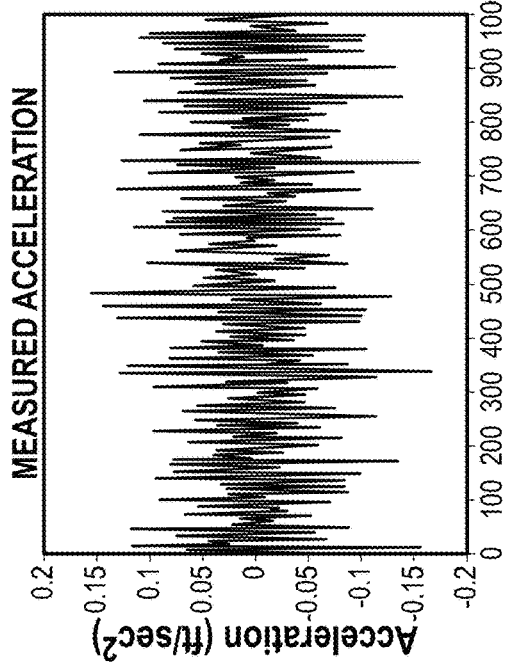
FIG. 4C illustrates a graph of measured acceleration at an accelerometer.

To estimate the instantaneous velocities and calculate the true depths of downhole tool 102, an accelerometer 142 is installed in downhole tool 102, specifically mandrel 140, to measure acceleration, as described above for FIGS. 3A and 3B. FIG. 4A, which is populated with synthetic data, illustrates a graph of the true accelerations of downhole tool 102, but noise (which may also be referred to as a noise signal) is captured in the measurements. FIG. 4B, which is populated with synthetic data, illustrates a graph that shows noise measurements may be measured by accelerometer 146 in measurements between −0.005 and 0.005 feet/second$^2$ (−1.5 and 1.5 millimeters/second$^2$). Eventually, after adding noises illustrated in the graph of FIG. 4B to true acceleration measurements in the graph of FIG. 4A, the final acceleration is plotted in the graph of FIG. 4C, which is populated with synthetic data.

Figure 5B:
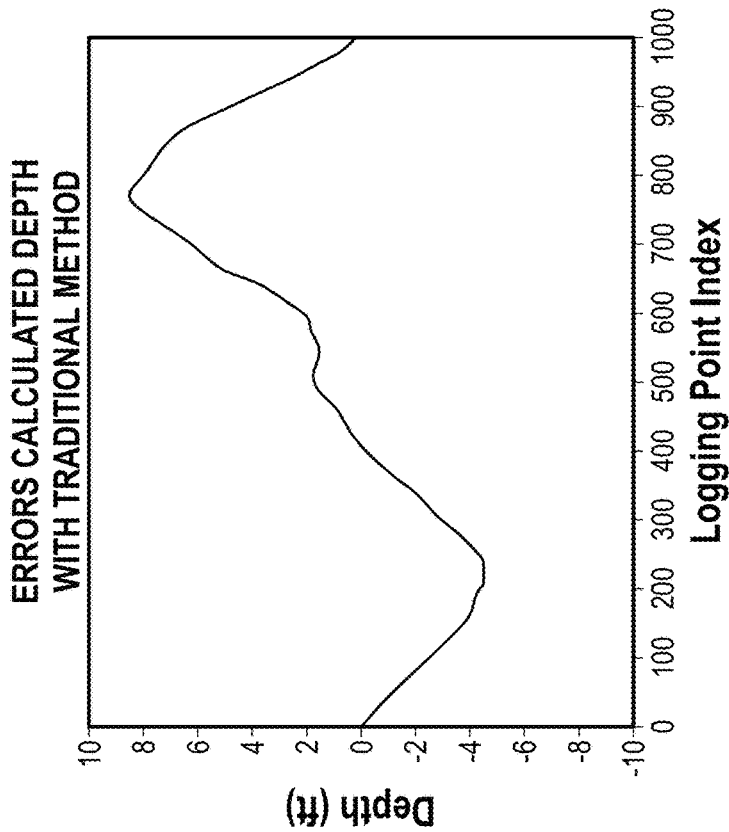
FIG. 5B illustrates a graph of errors from the calculated depth in FIG. 5A.
Figure 5A:
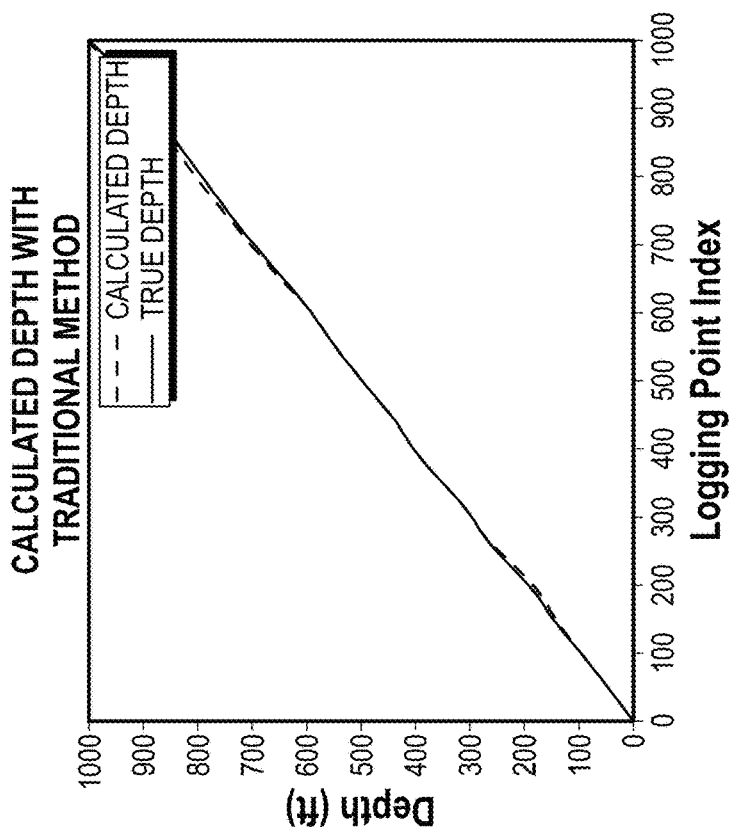
FIG. 5A illustrate a graph of calculated depth of the downhole tool using a double integral or acceleration measurements from FIG. 4C.

As noted above, the depth of downhole tool 102 may be estimated from the double integral of accelerations. However, the double integral process accumulates errors. FIG. 5A, which is populated with synthetic data, is a graph that calculates depths from synthetic data. Is should be noted that the last calculated depth is altered to be identical to the last true depth. This is due to logging operations when downhole tool 102 is pulled out to the surface, the total distance equals the total reeled wireline length, which is known. Comparing the calculated depths with the true depths illustrated in FIG. 3B, depth errors are found and plotted in FIG. 5B, which is populated with synthetic data. It is observed in the graph of FIG. 5B that the maximum error may be greater than 8 feet (2.5 meters) even though the acceleration measurements only have errors within 0.005 feet/second$^2$ (1.5 millimeters/second$^2$).

To avoid the error accumulation from accelerations, an independent measurement, the mismatch distance between the upper sensor(s) and the lower sensor(s) may be used. The definition of the mismatch distance is identified as the upper sensor(s) and the lower sensor(s) are separated by a fixed distance $d_{fix}$. At any given timer, the depth of the upper sensor(s) is $z_{upper}(\tau)$ and the depth of the lower sensor(s) is $z_{lower}(\tau)$. This may be equated as:

$$z_{upper}(\tau) - z_{lower}(\tau) = d_{fix} \qquad (1)$$

If the instantaneous velocity always equals the average velocity $v_0$, after $$\frac{d_{fix}}{v_0}$$

second, me lower sensor(s) depth $$z_{lower}\left(\tau + \frac{d_{fix}}{v_0}\right)$$

should match the upper sensor(s) depth at time $\tau$, which was $z_{upper}(\tau)$. However, the instantaneous velocity does not always equal the average velocity. Therefore, there is a mismatch distance defined as $$\Delta z(\tau) = z_{upper}(\tau) - z_{lower}\left(\tau + \frac{d_{fix}}{v_0}\right) \qquad (2)$$

Figure 6:
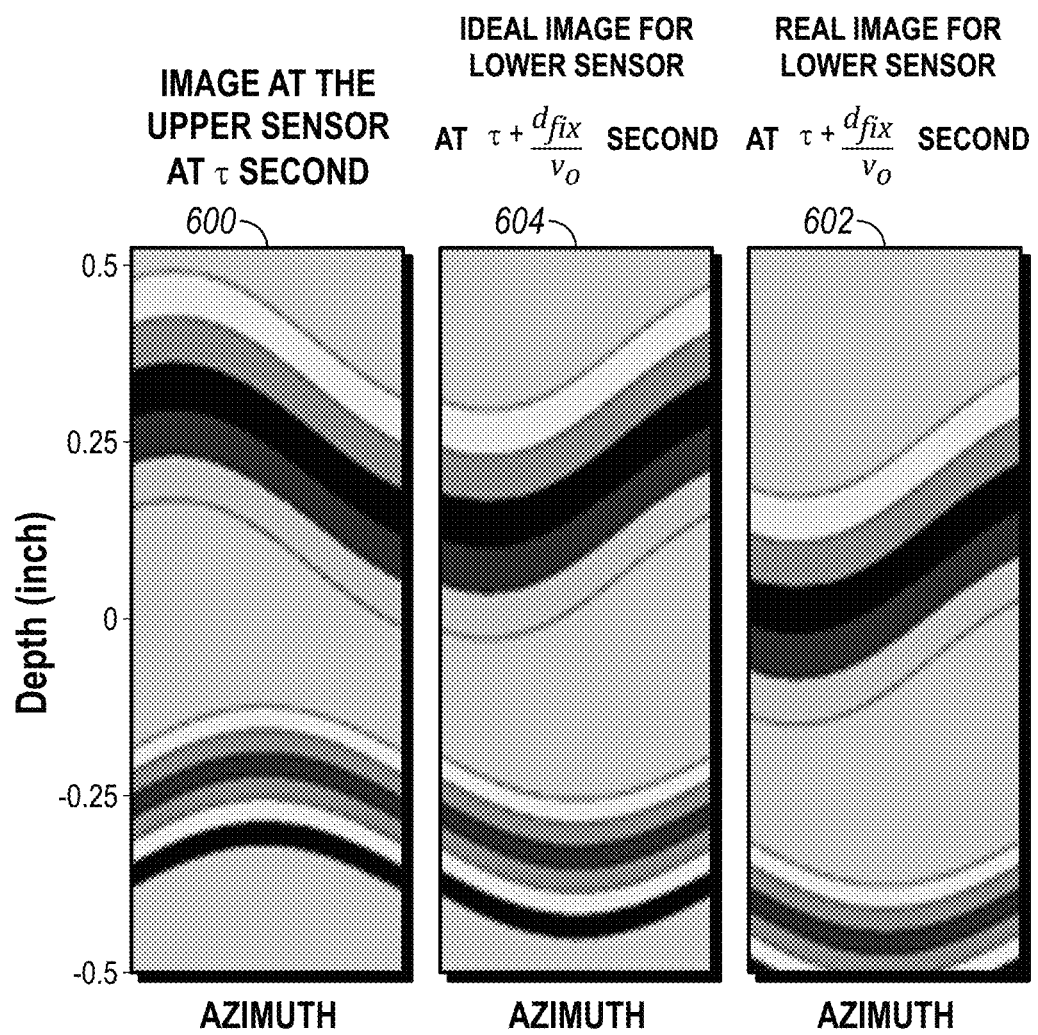
FIG. 6 is an illustration of a resistivity image from one or more pads using a mismatch distance.

When processing measurement data, the mismatch distance is found by comparing the images from the upper and lower sensors (i.e., resistivity images and/or the like). FIG. 6 shows resistivity image 600 from the upper sensor(s) at r second. Resistivity image 602 from the lower sensor(s) is shown at $$\left(\tau + \frac{d_{fix}}{v_0}\right)$$

second. Based on the continuity of the resistivity measurements, if the instantaneous velocity of downhole tool 102 always equaled to the average velocity, the image from the lower sensor(s) at $$\left(\tau + \frac{d_{fix}}{v_0}\right)$$

second should be resistivity image 604. Therefore, by comparing resistivity image 602 to resistivity image 604, the mismatch distance for time r may be found.

Figure 7C:
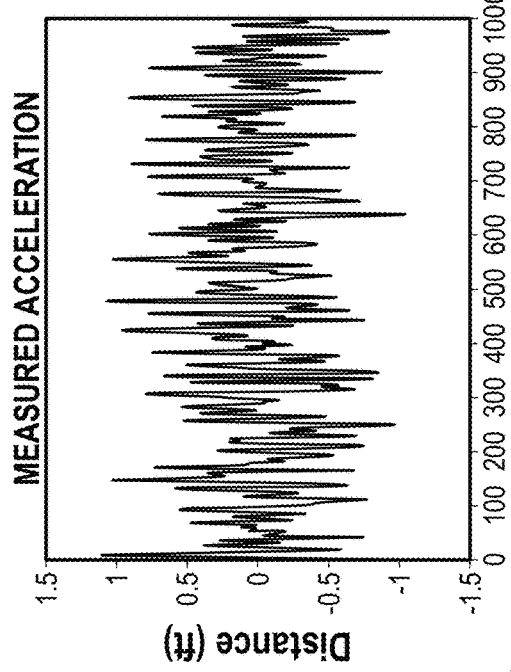
FIG. 7C illustrates a graph of a measured mismatch distance.
Figure 7B:
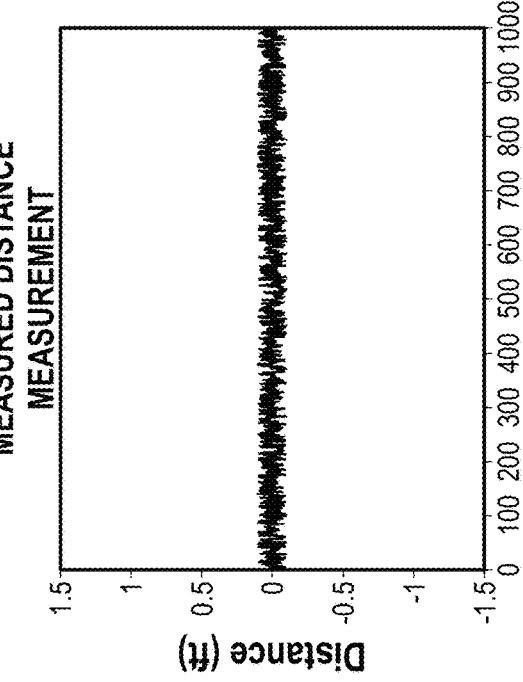
FIG. 7B illustrates a graph of noise measured in the mismatch distance measurements.
Figure 7A:
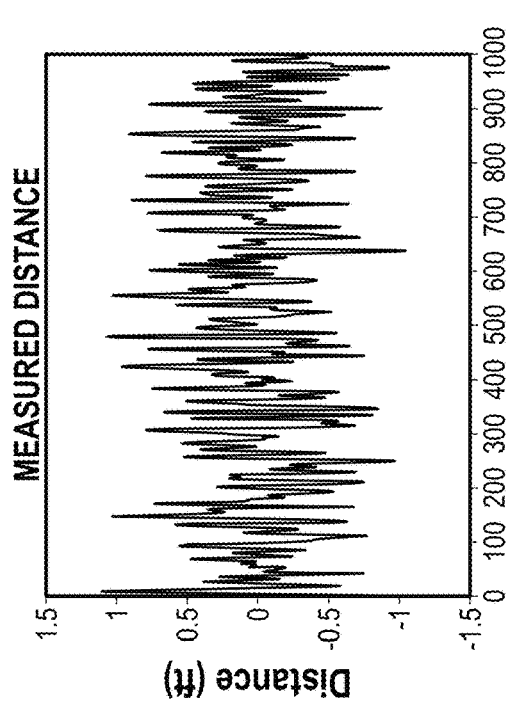
FIG. 7A illustrate a graph of a true mismatch distance.

FIGS. 7A-7C are graphs that plot the mismatch distances. As illustrated, FIGS. 7A, which is populated with synthetic data, is a graph of synthetic data showing a synthetic mismatch distance. FIG. 7B, which is populated with synthetic data, is a graph of synthetic noise that may be seen during measurement operations downhole. Specifically, FIG. 7B illustrates a graph with noises between −0.1 and 0.1 feet (−3 and 3 centimeters). FIG. 7C, which is populated with synthetic data, is a graph showing the combination of FIGS. 7A and 7B to obtain the measured mismatch distances.

To constating the instantaneous velocity, a mathematical relationship between velocities, mismatch depths, and accelerations is established. This is because distances are integral from velocities, the following equation is used.

$$z_{lower}\left(\tau + \frac{d_{fix}}{v_0}\right) = z_{lower}(\tau) + \int_{\tau}^{\tau + \frac{d_{fix}}{v_0}} v(t) \quad (3)$$

where v(t) is the instantaneous velocity. Combining Eq (1) to EQ (3), the following is derived:

$$\Delta z(\tau) = d_{fix} - \int_{\tau}^{\tau + \frac{d_{fix}}{v_0}} v(t) \quad (4)$$

For the computation purpose in information handling system 114, the integral is discretized and replaced with a summation. For the simplicity of equation derivation, the velocity is sampled with a time interval $$\Delta t = \frac{1}{n} * \frac{d_{fix}}{v_0},$$

where n is a constant positive integer. Δt is also a constant. Thus, Eq (4) may be rewritten as:

$$\Delta z_i = d_{fix} - \sum_{j=i}^{j=i+n-1} v_j \cdot \Delta t \quad (5)$$
$$= n * v_0 * \Delta t - \sum_{j=i}^{j=i+n-1} v_j \cdot \Delta t$$
$$= \sum_{j=i}^{j=i+n-1} v_o \cdot \Delta t - \sum_{j=i}^{j=i+n-1} v_j \cdot \Delta t$$
$$= -\sum_{j=i}^{j=i+n-1} (v_j - v_0)\Delta t$$

Further the velocity deviation is defined as:

$$\Delta v_j = v_j - v_0 \quad (6)$$

Combining Eq (5) and Eq (6), the following is derived:

$$\Delta z_i = -\Delta t \sum_{j=i}^{j=i+n-1} \Delta v_j \quad (7)$$

Additionally, acceleration is defined using the following Equation:

$$a_i = \frac{v_i - v_{i-1}}{\Delta t} \quad (8)$$
$$= \frac{(v_i - v_0) - (v_{i-1} - v_0)}{\Delta t}$$
$$= \frac{\Delta v_i - \Delta v_{i-1}}{\Delta t}$$

Where $a_i$ is the acceleration. From Eq (8) and Eq (6), the cost function may be established as a target joint inversion problem, shown below as:

$$\text{Cost} = \sum_{i=0}^{i=D-1} \left( \left(\Delta z_i + \Delta t \sum_{j=i}^{j=i+n-1} \Delta v_j\right)^2 + \lambda\left(a_i - \frac{1}{\Delta t}(\Delta v_i - \Delta v_{i-1})\right)^2 \right) \quad (9)$$

where λ is a tuning parameter to control the weight ratio between the misfit of mismatch distances and the misfit of accelerations, and D is the total number of measurements.

Equation (9) may be solved with a linear least-squared-based inversion approach (i.e., a closed-form solution or a gradient descent method) to obtain estimated Δv. A closed-form solution is found below:

$$\Delta v = (H_1^T H_1 + \lambda(H_2^T H_2))^{-1}(H_1^T \Delta z + \lambda(H_2^T a)) \quad (10)$$

Where Δv is the velocity deviation vector, Δz is the mismatch distance vector, and a is the acceleration vector, a matrix may be formed as:

$$H_1 = -\Delta t \begin{bmatrix} 1 & 1 & \dots & 1 & 0 & 0 & \dots & 0 \\ 0 & 1 & 1 & \dots & 1 & 0 & \dots & 0 \\ \vdots & \vdots & \vdots & \vdots & \vdots & \vdots & \ddots & \vdots \\ 0 & 0 & \dots & 0 & 1 & 1 & \dots & 1 \end{bmatrix} \quad (11)$$

each row has n ones and (D−n) zeros;

$$H_2 = \frac{1}{\Delta t} \begin{bmatrix} -1 & 1 & 0 & 0 & \dots & 0 \\ 0 & -1 & 1 & 0 & \dots & 0 \\ \vdots & \vdots & \ddots & \vdots & \vdots & \vdots \\ 0 & 0 & \dots & 0 & -1 & 1 \end{bmatrix} \quad (12)$$

each row has (D−2) zeros.

Eq (11) and (12) are utilized to solve for Δv, from this the instantaneous velocity may be calculated using $$v_j = \Delta v_j + v_0 \quad (13)$$

Figure 8:
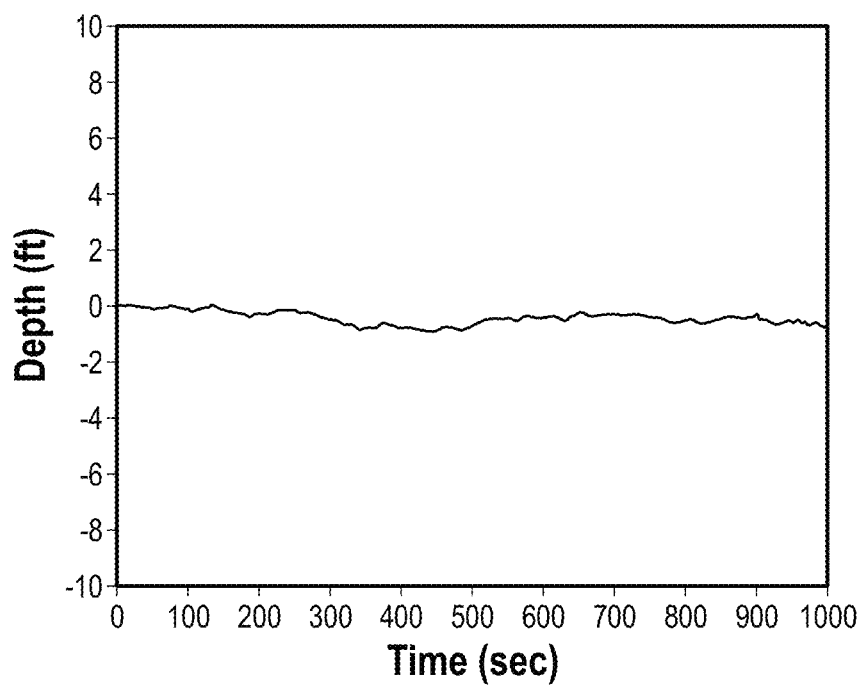
FIG. 8 is a graph of errors of the calculated depth from FIG. 7C.

Eventually, the depths from the integral of the instantaneous velocities may be calculated. The difference between the calculated depths and the true depths is plotted in FIG. 8. The depth errors are within 1 foot (0.3 meter). Comparing to the error plot in FIG. 5B, the accuracy of depth calculation is significantly improved by using the invented joint inversion method. Also, the invented method is very robust to the noise in acceleration measurements and mismatch distance measurements.

In other embodiments, for the synthetic test described above, downhole tool 102 (e.g., referring to FIG. 1 is logging up, the mismatch distance is defined as Equation (2). During operations when downhole tool 102 is logging down, similarly, the following may be used:

$$\Delta z(\tau) = z_{lower}(\tau) - z_{upper}\left(\tau + \frac{d_{fix}}{v_0}\right) \quad (14)$$

The logging direction change does not affect the discussion in this disclosure.

As noted above, traditionally, the depths of a logging tool are calculated form the double integral of acceleration recorded by an accelerometer. A double integral process accumulates errors that may become significantly larger over multiple acceleration measurements. The methods and systems discussed above are an improvement over the current technology in that a more accurate estimation of logging depth is found, which improves all well logs. As noted above, this may be achieved with a sensor disposed on separate pads with a fixed distance. Each sensor may be able to produce images (e.g., a resistivity image) to obtain the mismatch distance measurements. For example, by comparing the resistivity images of the upper pads and lower pads, a mismatch distance may be found and utilized to form a corrected image a specific depth in a three-hundred-and-sixty-degree view.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1: A method may comprise disposing a downhole tool into a borehole, taking one or more measurements of the borehole with one or more pads disposed on the downhole tool, creating one or more images from the one or more measurements to form an image log at a depth within the borehole, identifying a mismatch distance between the one or more images in the image log, and correcting the one or more images at the depth within the borehole based at least in part on the mismatch distance.

Statement 2. The method of statement 1, wherein the mismatch distance is a distance between a first pad and a second pad of the one or more pads.

Statement 3. The method of statement 2, wherein the first pad is above or below the second pad.

Statement 4. The method of any preceding statements 1 or 2, further comprising calculating $\Delta v$ which is a velocity deviation using a cost function:

$$\text{Cost} = \sum_{i=0}^{i=D-1}\left(\left(\Delta z_i + \Delta t \sum_{j=i}^{j=i+n-1} \Delta v_j\right)^2 + \lambda\left(a_i - \frac{1}{\Delta t}(\Delta v_i - \Delta v_{i-1})\right)^2\right),$$

wherein $\lambda$ is a tuning parameter to control a weight ratio between a misfit of the mismatch distance and a second misfit of an accelerations, D is a total number of the one or more measurements, $a_i$ is an acceleration of the downhole tool, and $\Delta t$ is a constant.

Statement 5. The method of statement 4, further comprising calculating $v_1$ which is an instantaneous velocity using:

$$v_j = \Delta v_j + v_0,$$

wherein $v_0$ is an average velocity.

Statement 6. The method of statement 5, further comprising calculating the depth from an integral of the instantaneous velocity.

Statement 7. The method of statement 4, wherein the cost function is solved using an inversion method.

Statement 8. The method of statement 7, wherein the inversion method is a linear least-squared-based inversion.

Statement 9. The method of any preceding statements 1, 2, or 4, further comprising correcting one or more acceleration measurements that include a noise signal.

Statement 10. The method of any preceding statements 1, 2, 4, or 9, further comprising correcting the image log at one or more depths using the mismatch distance.

Statement 11. A system may comprise a downhole tool that comprises one or more pads, wherein the one or more pads are configured to take one or more measurements at a depth in a borehole. The system may further comprise an information handling system configured to create one or more images from the one or more measurements to form an image log, identify a mismatch distance between the one or more images in the image log, and correct the one or more images at the depth within the borehole based at least in part on the mismatch distance.

Statement 12. The system of statement 11, wherein the mismatch distance is a distance between a first pad and a second pad of the one or more pads.

Statement 13. The system of statement 12, wherein the first pad is above or below the second pad.

Statement 14. The system of any preceding statement 11 or 12, wherein the information handling system is further configured to calculate $\Delta v$ which is a velocity deviation using a cost function:

$$\text{Cost} = \sum_{i=0}^{i=D-1}\left(\left(\Delta z_i + \Delta t \sum_{j=i}^{j=i+n-1} \Delta v_j\right)^2 + \lambda\left(a_i - \frac{1}{\Delta t}(\Delta v_i - \Delta v_{i-1})\right)^2\right),$$

wherein $\lambda$ is a tuning parameter to control a weight ratio between a misfit of the mismatch distance and a second misfit of an accelerations, D is a total number of the one or more measurements, $a_i$ is an acceleration of the downhole tool, and $\Delta t$ is a constant.

Statement 15. The system of any preceding statement 14, wherein the information handling system is further configured to calculate $v_1$ which is an instantaneous velocity using:

$$v_j = \Delta v_j + v_0,$$

wherein $v_0$ is an average velocity.

Statement 16. The system of statement 15, wherein the information handling system is further configured to calculate the depth from an integral of the instantaneous velocity.

Statement 17. The system of statement 14, wherein the cost function is solved using an inversion method.

Statement 18. The system of statement 17, wherein the inversion method is a linear least-squared-based inversion.

Statement 19. The system of any preceding statements 11, 12, or 14, wherein the information handling system is further configured to correct one or more acceleration measurements that include a noise signal.

Statement 20. The system of any preceding statements 11, 12, 14, or 19, wherein the information handling system is further configured to correct the image log at one or more depths using the mismatch distance.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   disposing a downhole tool into a borehole;
   taking two or more measurements of the borehole with one or more pads disposed on the downhole tool;
   creating two or more images from the two or more measurements to form an image log at a depth within the borehole;
   identifying a mismatch distance between the two or more images in the image log;
   determining an acceleration of the downhole tool with at least one accelerometer;
   determining an instantaneous velocity of the downhole tool with at least an average velocity of the downhole tool and a velocity deviation of the downhole tool, wherein the velocity deviation of the downhole tool is determined based at least on a cost function, wherein the cost function comprises the velocity deviation; and
   calculating a depth of the downhole tool with at least the instantaneous velocity.

2. The method of claim 1, wherein the mismatch distance is a distance between a first pad and a second pad of the two or more pads.

3. The method of claim 2, wherein the first pad is above or below the second pad.

4. The method of claim 1, further comprising calculating $\Delta v$ which is the velocity deviation vector using a cost function:

$$\text{Cost} = \sum_{i=0}^{i=D-1} \left( \left( \Delta z_i + \Delta t \sum_{j=i}^{j=i+n-1} \Delta v_j \right)^2 + \lambda \left( a_i - \frac{1}{\Delta t}(\Delta v_i - \Delta v_{i-1}) \right)^2 \right),$$

wherein $\lambda$ is a tuning parameter to control a weight ratio between a misfit of the mismatch distance and a second misfit of an accelerations, D is a total number of the one or more measurements, $\alpha_i$ is an acceleration of the downhole tool, $\Delta z_i$ is a mismatch distance vector, $\Delta v_j$ is the velocity deviation, $\Delta v_i$ is a velocity of the downhole tool, and $\Delta t$ is a constant.

5. The method of claim 4, further comprising calculating $v_j$ which is the instantaneous velocity using:

$$v_j = \Delta v_j + v_0,$$

wherein $v_0$ is the average velocity.

6. The method of claim 5, further comprising calculating the depth from an integral of the instantaneous velocity.

7. The method of claim 4, wherein the cost function is solved using an inversion method.

8. The method of claim 7, wherein the inversion method is a linear least-squared-based inversion.

9. The method of claim 1, further comprising correcting one or more acceleration measurements that include a noise signal.

10. The method of claim 1, further comprising correcting the image log at one or more depths using the mismatch distance.

11. A system comprising:
    a downhole tool that comprises one or more pads, wherein the one or more pads are configured to take one or more measurements at a depth in a borehole;
    an accelerometer configured to determine an acceleration of the downhole tool; and
    an information handling system configured to:
      create one or more images from the one or more measurements to form an image log;
      identify a mismatch distance between the one or more images in the image log;
      determine an instantaneous velocity of the downhole tool with at least an average velocity of the downhole tool and a velocity deviation of the downhole tool, wherein the velocity deviation of the downhole tool is determined based at least on a cost function, wherein the cost function comprises the velocity deviation; and
      calculate a depth of the downhole tool with at least the instantaneous velocity.

12. The system of claim 11, wherein the mismatch distance is a distance between a first pad and a second pad of the one or more pads.

13. The system of claim 12, wherein the first pad is above or below the second pad.

14. The system of claim 11, wherein the information handling system is further configured to calculate $\Delta v$ which is the velocity deviation vector using a cost function:

$$\text{Cost} = \sum_{i=0}^{i=D-1}\left(\left(\Delta z_i + \Delta t \sum_{j=i}^{j=i+n-1}\Delta v_j\right)^2 + \lambda\left(a_i - \frac{1}{\Delta t}(\Delta v_i - \Delta v_{i-1})\right)^2\right),$$

wherein $\lambda$ is a tuning parameter to control a weight ratio between a misfit of the mismatch distance and a second misfit of an accelerations, D is a total number of the one or more measurements, $\alpha_i$ is an acceleration of the downhole tool, $\Delta z_i$ is a mismatch distance vector, $\Delta v_j$ is the velocity deviation, $\Delta v_i$ is a velocity of the downhole tool, and $\Delta t$ is a constant.

15. The system of claim 14, wherein the information handling system is further configured to calculate $v$; which is the instantaneous velocity using:

$$v_j = \Delta v_j + v_0,$$

wherein $v_0$ is the average velocity.

16. The system of claim 15, wherein the information handling system is further configured to calculate the depth from an integral of the instantaneous velocity.

17. The system of claim 14, wherein the cost function is solved using an inversion method.

18. The system of claim 17, wherein the inversion method is a linear least-squared-based inversion.

19. The system of claim 11, wherein the information handling system is further configured to correct one or more acceleration measurements that include a noise signal.

20. The system of claim 11, wherein the information handling system is further configured to correct the image log at one or more depths using the mismatch distance.

\* \* \* \* \*